United States Patent
Son (10) Patent No.: US 9,740,015 B2
(45) Date of Patent: Aug. 22, 2017

(54) THREE-DIMENSIONAL IMAGING SYSTEM BASED ON STEREO HOLOGRAM HAVING NINE-TO-ONE MICROLENS-TO-PRISM ARRANGEMENT

(71) Applicant: Konyang University Industry-Academic Cooperation Foundation, Chungcheongnam-do (KR)

(72) Inventor: Jung Young Son, Chungcheongnam-do (KR)

(73) Assignee: Konyang University Industry-Academic Cooperation Foundation, Chungcheongnam-do (KR)

( * ) Notice: Subject to any disclaimer, the term of this patent is extended or adjusted under 35 U.S.C. 154(b) by 235 days.

(21) Appl. No.: 14/151,212

(22) Filed: Jan. 9, 2014

(65) Prior Publication Data

US 2014/0198364 A1   Jul. 17, 2014

(30) Foreign Application Priority Data

Jan. 11, 2013  (KR) ........................ 10-2013-0003282

(51) Int. Cl.
  *G03H 1/26* (2006.01)
  *G02B 27/22* (2006.01)
  *H04N 13/04* (2006.01)

(52) U.S. Cl.
  CPC .......... *G02B 27/2214* (2013.01); *G02B 27/22* (2013.01); *G02B 27/2228* (2013.01); *G03H 1/268* (2013.01); *G03H 2223/18* (2013.01); *G03H 2223/19* (2013.01); *H04N 13/0402* (2013.01); *H04N 13/0418* (2013.01); *H04N 13/0459* (2013.01)

(58) Field of Classification Search
  None
  See application file for complete search history.

(56) References Cited

U.S. PATENT DOCUMENTS

| | | | | |
|---|---|---|---|---|
| 2006/0227418 A1* | 10/2006 | Takaki | ............... | H04N 13/0404 359/463 |
| 2007/0145248 A1* | 6/2007 | Babayoff | ........... | G02B 21/0032 250/216 |
| 2008/0144180 A1* | 6/2008 | Nishida | .................... | H01J 11/12 359/601 |
| 2008/0218853 A1* | 9/2008 | El-Ghoroury | ........ | G03B 21/625 359/449 |
| 2009/0323030 A1* | 12/2009 | Hazama | ............. | G02B 27/0927 353/38 |
| 2012/0127570 A1* | 5/2012 | Sakai | ................. | G02B 27/2214 359/463 |

* cited by examiner

Primary Examiner — Stephone B Allen
Assistant Examiner — Ryan S Dunning
(74) Attorney, Agent, or Firm — Rabin & Berdo, P.C.

(57) ABSTRACT

A three-dimensional imaging system based on a stereo hologram is disclosed. Images composed of sub-images having the same vertical-horizontal resolutions which are generated at plural image projection modules having a two-dimensional arrangement structure are projected to a prism array plate or a transmission-type diffusion plate, and are converted into light points, i.e., image points through a microlens array unit. A diffusion plate used as an image display screen is mounted to a position at which images diffused from the light points intersect with images diffused from the adjacent light points.

10 Claims, 6 Drawing Sheets

THREE-DIMENSIONAL IMAGING SYSTEM BASED ON STEREO HOLOGRAM HAVING NINE-TO-ONE MICROLENS-TO-PRISM ARRANGEMENT

STATEMENT REGARDING SPONSORED RESEARCH

This inventions was partly supported by the Korean Ministry of Culture, Sports and Tourism and the Korea Creative Contents Agency (Kocca) under the Culture Technology (CT) Research and Development Program 2013, and IT R&D program of MSIP/MOTIE/KEIT[10039169, Development of Core Technologies for Digital Holographic 3-D Display and Printing System]", and the IT R&D program of MKE/KEIT[K1001810035337, development of interactive wide viewing zone SMV optics of 3D display], and Giga-KOREA project, [GK13D0100, Development of Telecommunications Terminal with Digital Holographic Table-top Display].

BACKGROUND OF THE INVENTION

Field of the Invention

The present invention relates to a three-dimensional imaging system, and more particularly, to a three-dimensional imaging system based on a stereo hologram, in which images composed of sub-images having the same vertical-horizontal resolutions which are generated at plural image projection modules having a two-dimensional arrangement structure are projected to a prism array plate or a transmission-type diffusion plate and then are converted into light points, i.e., image points by a microlens array. And a diffusion plate used as an image display screen is also mounted to a position at which an image expanded from an image point intersects with images expanded from the adjacent image points.

Description of the Related Art

Recently, three-dimensional imaging technologies, such as 3D cinemas, 3D TVs, 3D monitors or the like, for realizing 3D stereoscopic images have been developed. Representative methods of realizing 3D stereoscopic images include a system using 3D glasses and a multi-view imaging system.

A system for obtaining 3D effect using 3D glasses has inconvenience of wearing 3D glasses and a problem of image distortion. However, 3D products using 3D glasses are very well received by consumers due to high speed display, maximized depth of stereoscopic images through 3D glasses, changeability of viewing position and high resolution corresponding to the resolution of the display panel for both left and right eye images.

A multi-view imaging system has characteristics of allowing a viewer to change viewing position and minimizing image distortion which is a major problem of a 3D imaging system using 3D glasses. However, because resolution of an image projected to a viewer's eyes at a position within a viewing zone is too low due to limitation in resolution of a display panel, 3D products using a multi-view imaging system have not been well received by consumers and are still not fully commercialized.

But the resolution problem is not the major problem in the multi-view imaging system. The major problem is that it cannot generate a natural 3D image that causes no eye fatigue for viewers. In order to provide 3D images without eye fatigue, a multi-view imaging system should at least be constituted to project composite images providing a continuous parallax to a viewer's eyes at a viewing position within the viewing zone ("3-D imaging for creating real world like environments", IEEE Proceedings, V101(1), pp 190-205, 2013).

In order to accomplish this, the number of multi-view images and resolution of each view image should be comparable to that of a flat panel display, and the arrangement distance between two adjacent view images should not be recognized at the viewing position. The resolution of image projected to a viewer's eyes at a viewing position is given by the number of multi-view images, and the resolution of each view image should be high in order to provide continuous parallax. The only way of realizing this is to convert each of the view images into a light point and to form a two-dimensional array of the light points, which has a minimum gap between the light points. The representative example capable of achieving this is a Zebra hologram (U.S. Pat. No. 7,227,674, "Active digital hologram displays", registered on Jun. 5, 2007).

The Zebra hologram is a kind of two-dimensional stereo hologram, in which each view image is focused to a point on a photographic film and made as an image hologram with a reference beam. To make an array of point holograms, each view image within a multiview image array is displayed on a spatial light modulator (SLM), then focused to an image point on the photographic film and recorded as a point hologram, i.e., a point image hologram. Then next view image is displayed on the SLM and again recorded as a point hologram plate by shifting the photographic film for a designed distance in both horizontal and vertical directions. The arrangement order of these point image holograms is the same as each view image within the multiview image array. It may be possible theoretically for realizing an electronic version of the Zebra hologram. However, the actual possibility of realizing the Zebra hologram is extremely low because of cost and structural problems: Arranging the two-dimensional image points with the resolution of a display panel and with a gap between adjacent image points unperceived by a viewer, with use of a display device and other required components for making image point will cause the problems.

One of the methods of solving this problem is the focus light Array ("Ocular Accommodation by Super Multi-View Stereogram and 45-View Stereoscopic Display", IDW'96, Proc. of the 11$^{th}$ International Display Workshops, PP489-492, 1996). Such a focus light Array, similar to a method of arranging multi-view images at pixel cells in a general contact type 3D imaging apparatus only having horizontal parallax (Jung-Young Son and Bahram Javidi, "3-Dimensional Imaging Systems Based on Multiview Images" (Invited Paper), IEEE/OSA J. of Display Technology, V1(1), pp 125-140, 2005), corrects the same position pixel from each view image in a one-dimensional multiview image array, then arrange them to the order of the image in the multiview image array as a pixel cell and focused them in to a point on the display screen in the order of the pixel in each view image by a two dimensional scanner. Since each light point is expanded, each pixel in the point will be separate angularly from its neighboring pixels. The net result of this angular separation induces the effects of the multiview images superposed by pixel by pixel order, which are propagating with different angles.

However, such a method has a problem in creating images capable of generating continuous parallax at a viewer's position because it is very difficult to make hundreds of pixels be in each pixel cell.

Recently, a method of recording a pixel cell as a beam of line light on a rewritable photographic plate has been reported ("An Updatable Holographic Display for 3D Visualization", Journal of display technology, V4(4), pp 424-430, 2008). This method is similar to the focus light array, but only needs scanning in a horizontal direction because a unit pixel cell is focused to a beam of line light. However, because the photoplate doesn't allow recording in real time, it is difficult to display a video image. Additionally, because a hologram recording device for continuous recording and deleting should be included, this method can be hardly used for display.

SUMMARY OF THE INVENTION

Therefore, the present invention has been made in view of the above problems, and it is an object of the present invention to provide a three-dimensional imaging system based on a stereo hologram, which is capable of creating auto-stereoscopic images by increasing the number of pixels and providing continuous parallax at a viewer's position using plural image projection modules having a two-dimensional array structure, a prism array plate or a transmission-type diffusion plate, and a microlens array unit.

In accordance with the present invention, the above and other objects can be accomplished by the provision of a three-dimensional imaging system based on a stereo hologram including an image projection unit which includes plural image projection modules configured to project images in a direction or to two-dimensionally, arranged equidistantly from each other, a transmission diffusion unit which is constituted such that the image projected from each of the image projection modules is diffused along a predetermined path while transmitting the transmission diffusion unit that is arranged parallel with the image projection unit, a microlens array unit which includes plural microlenses arranged consecutively corresponding to an array of images diffused by the transmission diffusion unit while transmitting the diffused images in order to create an array of image points corresponding to the respective images and which is arranged parallel with the transmission diffusion unit, and a diffusion plate which is constituted such that the respective image points created by the microlens array unit are diffused to generate consecutive images without overlapping with images diffused from adjacent image points.

The image projection modules may be constituted to project images composed of an array of sub-images in one direction.

Each of the image projection modules may include an image projector configured to project an image composed of an array of sub-images in one or two directions, and a focus lens part configured to convert each of the projected sub-images from each image projector into an image point.

Alternatively, each of the image projection modules may include a projection image chip configured to project an image composed of an array of sub-images in one direction, and a magnification optical system configured to magnify the projected image from the projection image chip.

The transmission diffusion unit may be located at a position at which the projected image from any one of the image projection modules of the image projection unit intersects with the projected image from the adjacent image projection module.

The transmission diffusion unit may include a prism array plate in which plural prisms are consecutively arranged or a transmission-type diffusion plate.

The transmission diffusion unit may include a prism array plate in which a plurality of quadrangular pyramid-shaped prisms are arranged such that a bottom surface of each of the prisms is directed toward the image projection unit.

The bottom surface of each of the prisms may be formed to have the same shape and area as the image projected from each of the image projection modules.

The prism array plate may be formed such that a center of the image projected from each of the image projection modules is consistent with an apex of the prism corresponding to the image.

The bottom surface of each of the prisms of the prism array plate may be located at a focus of the microlens array unit.

The bottom surface of each of the prisms of the prism array plate may be located at a distance greater than two times a focal distance of the microlens array unit.

The array of the sub-images of the images projected to the transmission diffusion unit may be consistent with the array of the microlenses of the microlens array unit.

Each of the images projected to the transmission diffusion unit may have the same or greater vertical and horizontal sizes than each of the microlenses of the microlens array unit.

The diffusion plate may function as an image display screen.

The diffusion plate may be located at a position at which the images converted into the image points by the microlens array unit are diffused and intersect each other.

According to the present invention, high-quality three-dimensional stereoscopic images can be realized by smoothly providing continuous parallax at a viewer's position by increasing the number of pixels included in each pixel cell.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, constitution of a three-dimensional imaging system based on a stereo hologram according to an embodiment of the present invention will be described in detail with reference to the annexed drawings.

Figure 1:
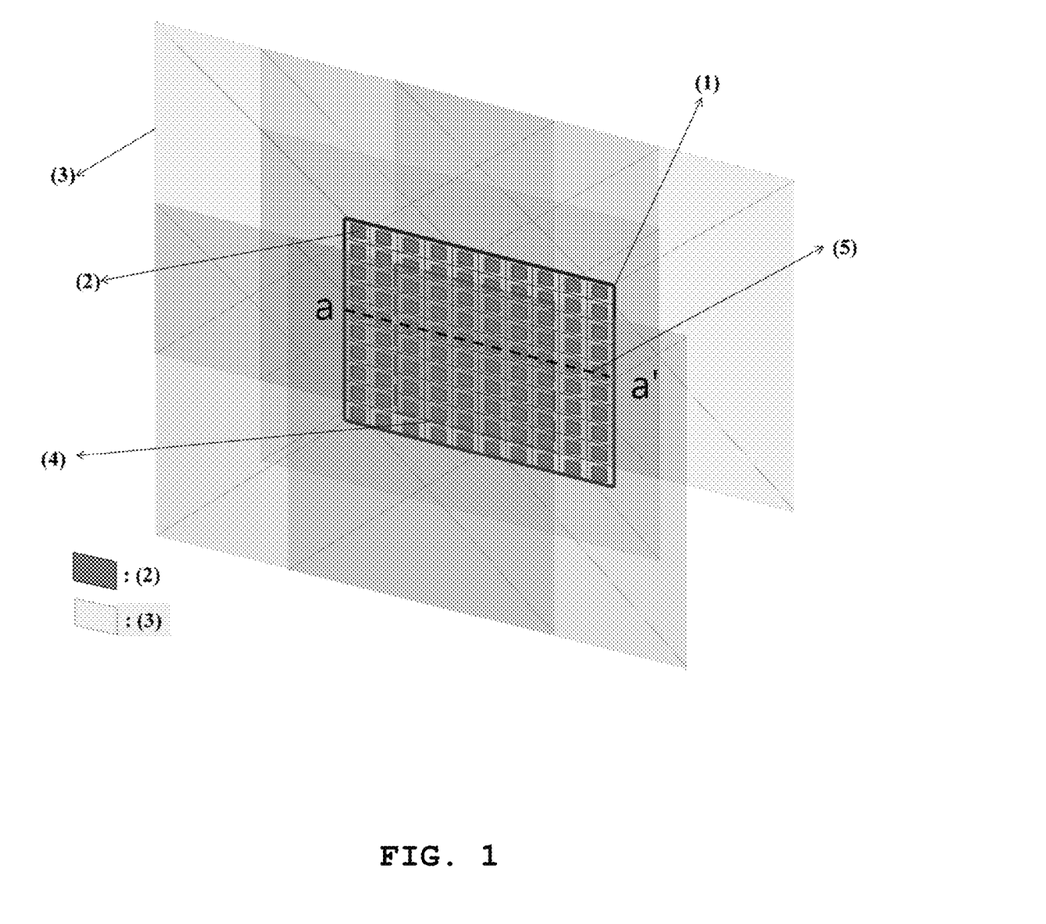
FIG. 1 is a conceptual view illustrating an image reproduction principle of a two-dimensional stereo hologram.

FIG. 1 is a conceptual view illustrating a general image reproduction principle of a two-dimensional stereo hologram. A two-dimensional stereo hologram 1 depicted in FIG. 1 includes 10×10 point-image holograms 2. When an image is reproduced, a view image is reproduced at each of the point-image holograms 2 and is projected as a magnified image 3. The magnified images from all of the point-image holograms 2 are overlapped at an overlapping space 4. Because a composite image including one pixel from each of the magnified images 3 is projected to any point in the overlapping space 4, the overlapping space 4 becomes a viewing zone. At this time, the image projected to each point of the overlapping zone 4 from the two-dimensional stereo hologram 1 is composed of 10×10 pixels.

Figure 2:
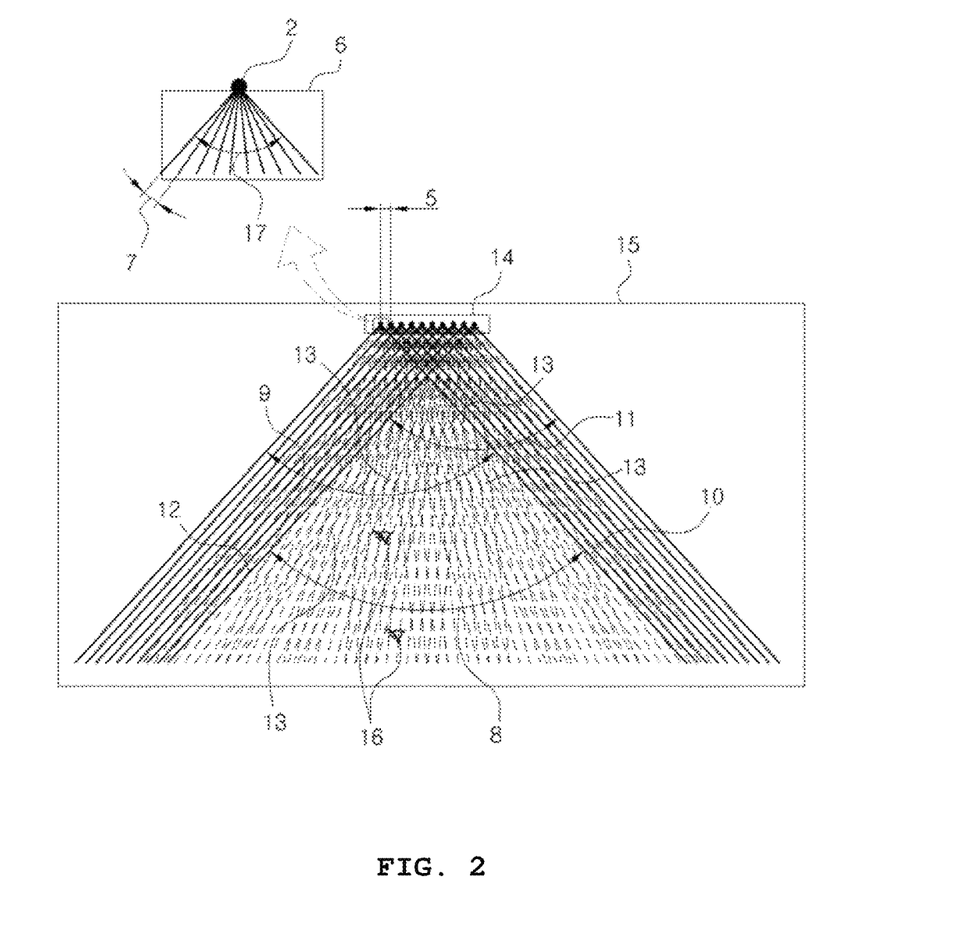
FIG. 2 is a conceptual view illustrating image projection of point-image holograms taken along line a-a' in FIG. 1.

FIG. 2 is a conceptual view illustrating image projection of the point-image holograms taken along line a-a' in FIG. 1, in which magnified images in a horizontal direction of the point-image holograms 2 with respect to line a-a' in FIG. 1 are illustrated.

Each of reproduced images 6 of ten point-image holograms 2, which are arranged apart from each other by a regular distance 5 in a horizontal direction in FIG. 2, is composed of nine pixels 7. At this time, a viewing zone 8 is a zone which is defined by a right boundary line 10 of a first reproduced image 9 and a left boundary line 12 of a tenth reproduced image 11 which intersect each other. Spaces 13 defined by dotted lines in this zone in FIG. 2 are spaces formed by overlapping of the respective pixels 7 of ten reproduced images 15 of ten point-image holograms 14 with respect to line a-a'. By getting one pixel from each of the ten reproduced images 15, a composite image composed of ten pixels is projected to a viewer's eyes 16.

Pixel arrangement in the composite image is respectively different in the different spaces 13. A size of the spaces 13 is defined by a distance 5 between adjacent point-image holograms and the number of pixels and a divergence angle 17 of each reproduced image. The size of the spaces 13 is reduced, as the distance 5 between the adjacent point-image holograms is short, the number of pixels is large and the divergence angle 17 is small. As the number of pixels is increased, the number of spaces 13 is also increased.

Figure 3:
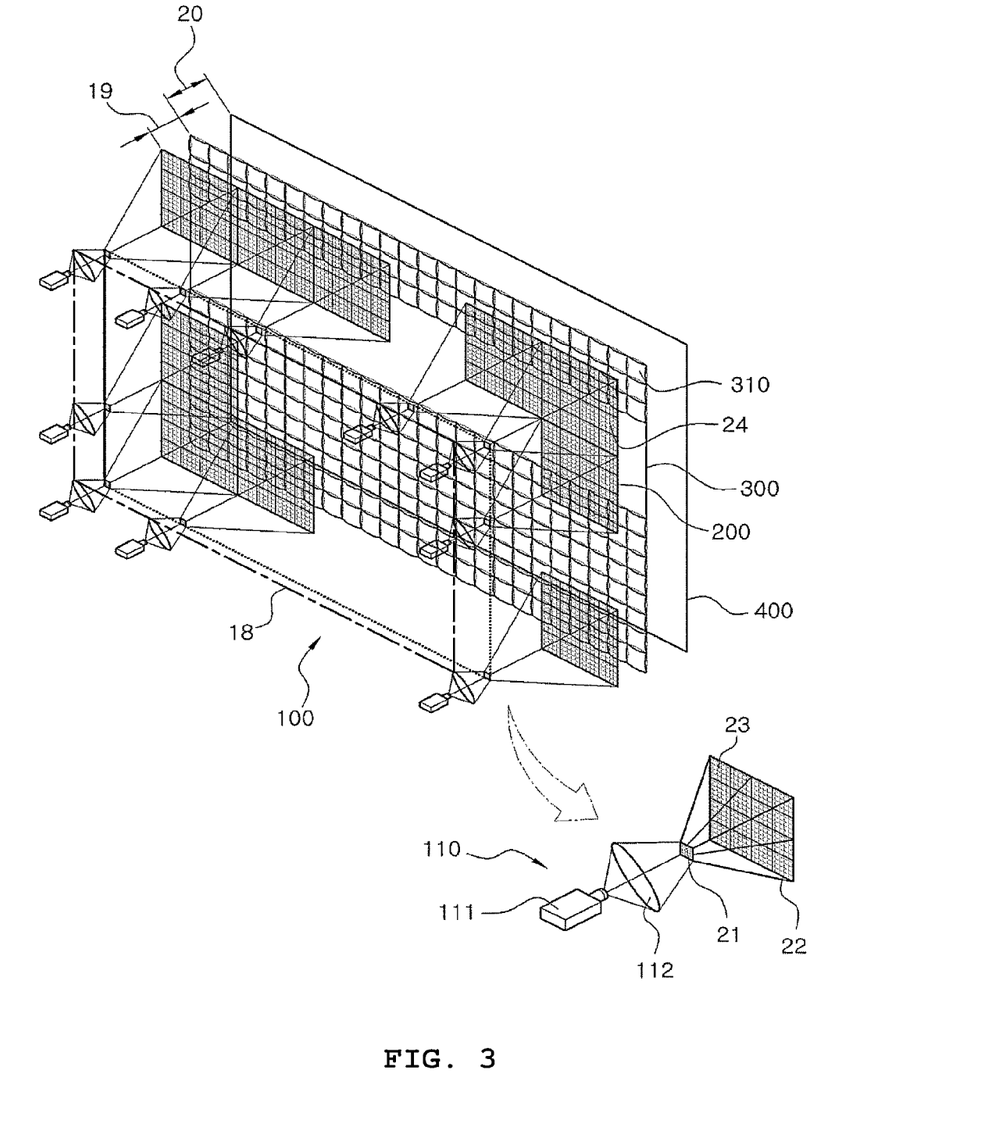
FIG. 3 is a structural view illustrating a structure of a three-dimensional imaging system based on a two-dimensional stereo hologram according to a preferred embodiment of the present invention.

FIG. 3 is a structural view illustrating a structure of a three-dimensional imaging system based on a two-dimensional stereo hologram according to a preferred embodiment of the present invention. A three-dimensional imaging system of the present invention comprises an image projection unit 100, a transmission diffusion unit 200, a microlens array unit 300 and a diffusion plate 400.

The image projection unit 100 includes plural image projection modules 110 which are configured to projected images in one direction and are two-dimensionally arranged equidistantly from each other. Although the image projection unit 100 in this embodiment includes twenty-four image projection modules 110, illustration of some of the image projection modules 110 is omitted in FIG. 3 for clear understanding of the structure.

The image projection modules 110 are constituted to projected images composed of an array of sub-images in one direction. In detail, each of the image projection modules 110 includes an image projector 111 configured to project an image composed of an array of sub-images in one direction, and a focus lens part 112 which has a convex lens shape and is configured to convert the image projected from the image projector 111 into an image point.

The transmission diffusion unit 200 is constituted such that the projected image from each of the image projection modules 110 is diffused along a predetermined path while penetrating the transmission diffusion unit 200. The transmission diffusion unit 200 is arranged parallel with the image projection unit 100. In detail, the transmission diffusion unit 200 may be a prism array plate 210 in which plural prisms 211 are consecutively arranged or a transmission-type diffusion plate. Hereinafter, an exemplary embodiment in which the transmission diffusion unit 200 is the prism array plate 210 will be described.

The transmission-type diffusion plate may be one of various elements other than a prism, which are capable of allowing penetration of the image projected from each of the image projection modules 110 and diffusing the image along a predetermined path. That is, the transmission-type diffusion plate performs the same function as the prism array plate 210.

As a result, an image point 21 generated at each of the image projection modules 110 is projected to the prism array plate 210.

Figure 5:
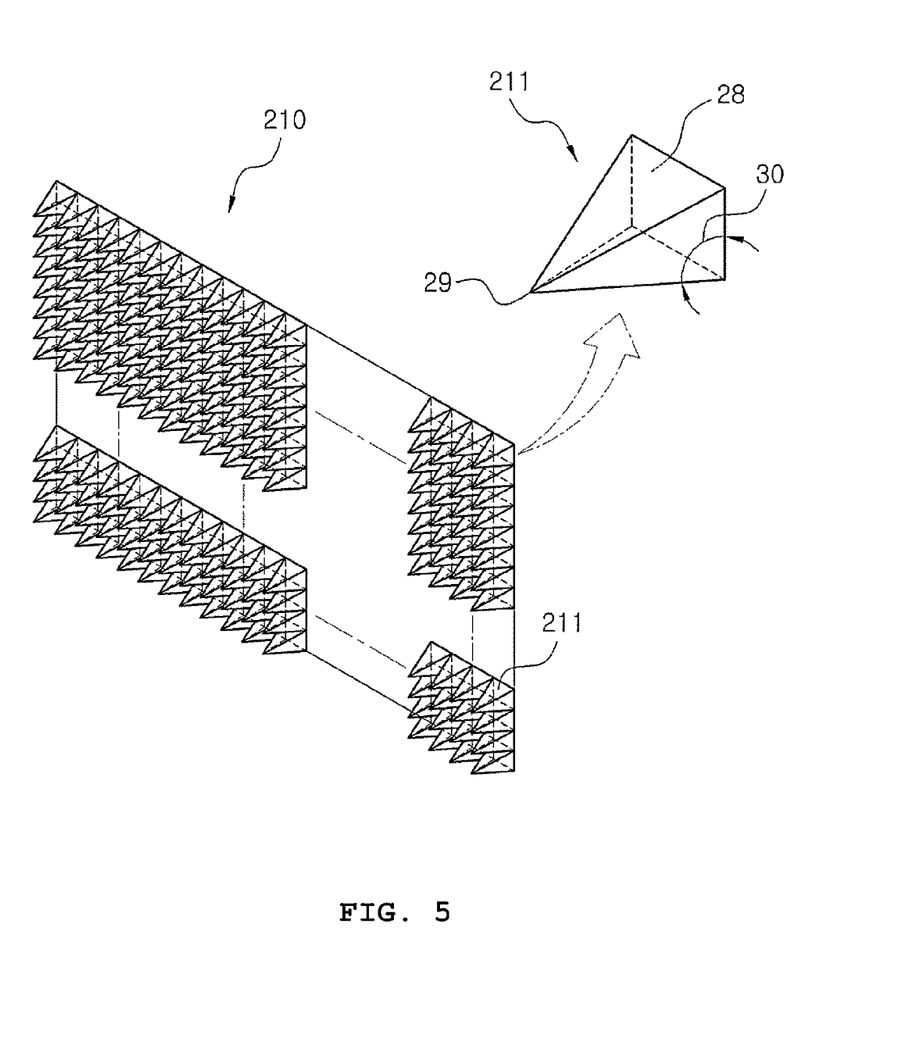
FIG. 5 is a structural view illustrating a shape of a prism array plate according to a preferred embodiment of the present invention.

FIG. 5 is a structural view illustrating a shape of the prism array plate according to a preferred embodiment of the present invention. The prism array plate 210 includes a plurality of quadrangular pyramid-shaped prisms 211 which are two-dimensionally arranged and lie such that a quadrangular bottom surface 28 of each of the prisms 211 is directed toward the image projection unit 100. The image (sub-image) projected from each of the image projection modules 110 is projected to the bottom surface of each of the prisms.

The arrangement of the prisms 211 is the same as the arrangement of the image projection modules 110. The prisms 211 are arranged such that sides of the bottom surface of each of the prisms are in contact with sides of the bottom surfaces of the adjacent prisms.

Additionally, the bottom surface of each of the prisms 211 is formed to have the same shape and area as the image (sub-image) projected from each of the image projection modules 110. Four triangular side surfaces of each of the prisms 211, which connect an apex 29 and the bottom surface 28, are formed symmetrically to each other.

Further, the prism array plate 210 is formed such that a center of the image projected from each of the image projection modules 110 is consistent with the apex of the prism 211 corresponding to the image. Accordingly, an inclined plane angle 30 of each triangular side surface of the prism 211 is substantially symmetric to a progress direction of the image.

The microlens array unit 300 includes a plurality of microlenses 310 which have a convex lens shape and are consecutively arranged corresponding to an array of images diffused by the transmission diffusion unit 200 while penetrating the same. Accordingly, the microlens array unit 300 generates an array of image points with respect to the respective images. The microlens array unit 300 is arranged parallel with the transmission diffusion unit 200. An array of sub-images of the images projected to the transmission diffusion unit 200 is consistent with an array of the microlenses 310 of the microlens array unit 300, thereby converting each of the sub-images projected to the prism array plate 210 into an image point.

The diffusion plate 400 is constituted such that the respective image points created by the microlens array unit 300 are diffused to generate consecutive images without overlapping with the images diffused from the adjacent image points. The diffusion plate 400 is used as an image display screen onto which the image points generated at the microlens array unit 300 are projected.

The image projection unit 100 including the plural image projection modules 110 which are two-dimensionally arranged equidistantly from each other, the projection plane, i.e., the bottom surface of each prism 211 of the transmission diffusion unit 200, the microlens array unit 300 and the diffusion plate 400 are arranged parallel with each other.

An image generating process will now be described. An array of the image projection modules 110 composing the image projection unit 100 serves to generate an array 18 of image points. As described above, the image projection modules 110 for forming an array of sub-images 23 are two-dimensionally arranged.

When each of the image projection modules 110 includes the image projector 111 and the focus lens part 112 which has a convex lens shape for focusing the image projected from the image projector 111, the image focused by the focus lens part 112 of the image projection module 110 is diffused and displayed as an image 22 composed of a two-dimensional array of the sub-images 23 on the prism array plate 210 for changing a progress direction of beams.

The transmission diffusion unit 200 is located at a position at which the image projected from any one image projection module of the image projection unit 100 intersects with the image projected from the adjacent image projection module. Accordingly, the images 22 projected to the prism array plate 210 from the respective image projection modules 110 are connected just like a single image without any gap therebetween, and the image composed of an array of the sub-images 23 is displayed on the whole prism array plate 210.

The microlens array unit 300, which includes microlenses 310 arranged identically to the sub-images 23 on the prism array plate 210, is positioned in front of the prism array plate 210. The sub-images 24 corresponding to the respective microlenses 310 of the microlens array unit 300 and the surrounding some sub-images are focused, and the focus plane is formed between the microlens array unit 300 and the diffusion plate 400. The respective sub-images 23 on the prism array plate 210 are rotated 180 degrees and the rotated images are displayed on the diffusion plate 400. The diffusion plate 400 functions as a final image display screen.

A distance 19 between the prism array plate 210 and the microlens array unit 300 may be the same as a focal distance of each microlens 310 of the microlens array unit 300 so that the bottom surface of each prism 211 of the prism array plate 210 is located at a focus of the microlens array unit 300, or may be set such that the bottom surface of each prism 211 of the prism array plate 210 is located at a distance greater than two times the focal distance of the microlens array unit 300.

A distance 20 between the microlens array unit 300 and the diffusion plate 400 may be set such that the diffusion plate 400 is located at a position at which the images converted into the image points by the microlens array unit 300 are diffused and intersect each other so that the images composed of sub-images contact each other and act as a unitary image on the diffusion plate 400.

Each of the images projected to the transmission diffusion unit 200 has the same or greater vertical and horizontal sizes than each of the microlenses 310 of the microlens array unit 300. In other words, by making the vertical and horizontal sizes of the microlens array unit 300 equal to or smaller than the sizes of the images penetrating the prism array plate 210, the respective sub-images progress parallel with each other or are completely overlapped at a certain point in the space.

Figure 4:
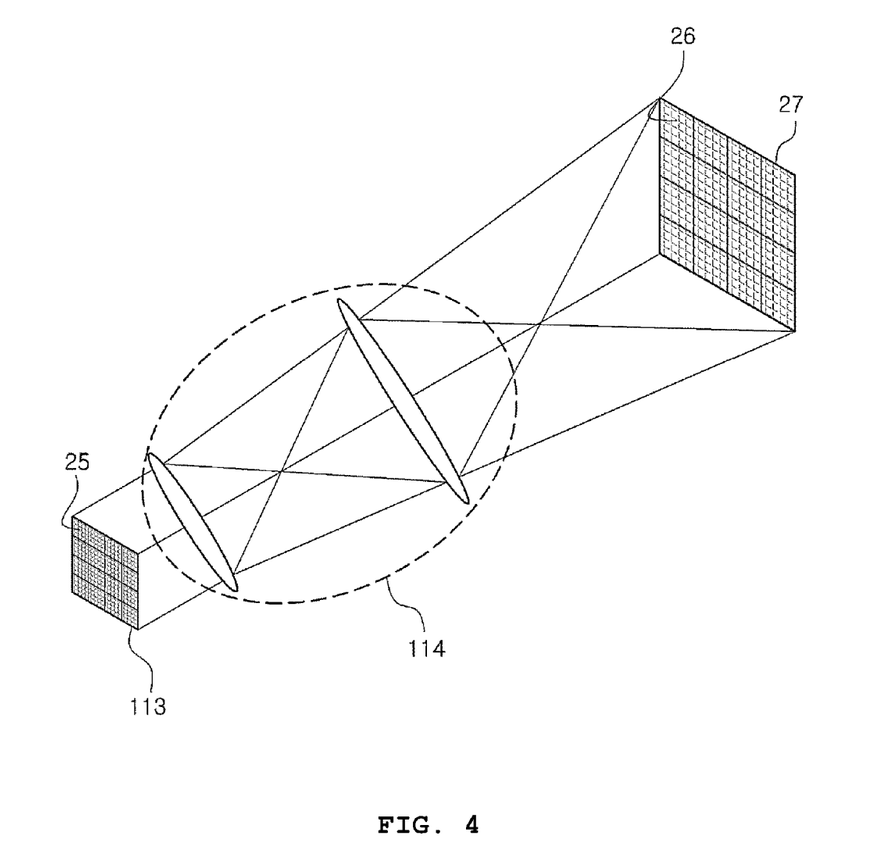
FIG. 4 is a structural view illustrating a direct image projection module according to another embodiment of the present invention.

FIG. 4 is a structural view illustrating a direct image projection module according to another embodiment of the present invention. An image projection module 110 includes a projection image chip 113 configured to project an image composed of an array of sub-images in one direction, and a magnification optical system 114 configured to magnify the image projected from the projection image chip 113.

By using the image projection module 110 including the projection image chip 113 and the magnification optical system 114 instead of the image projector 111 and the focus lens part 112 (refer to FIG. 3), an image composed of an array of sub-images 25 is projected from the projection image chip 113 and magnified by the magnification optical system 114, and accordingly, an image 27 of the projection image chip 113, which is composed of an array of sub-images 26, is acquired on the prism array plate 210 without an array of image points.

Figure 6:
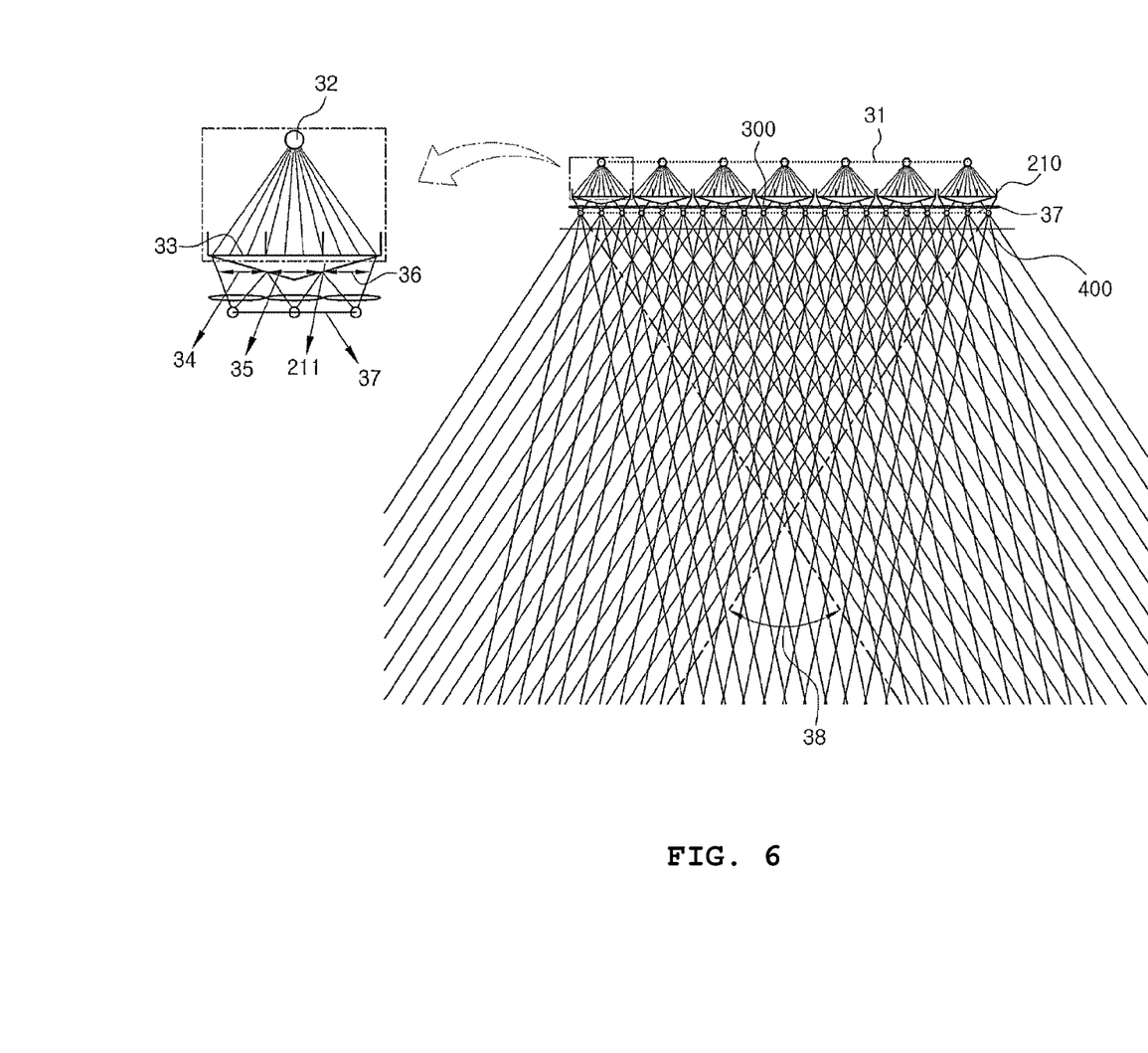
FIG. 6 is a cross (or longitudinal) sectional view of the three-dimensional imaging system in FIG. 3 to illustrate image projection.

FIG. 6 is a cross (or longitudinal) sectional view of the three-dimensional imaging system in FIG. 3 to illustrate image projection. A image point 32 of an array 31 of image points formed by the focus lens parts 112 of the image projection modules 110 is diffused, and thus an image 33 composed of sub-images 34, 35 and 36 is projected to the bottom surface 28 of each prism 211 of the prism array plate 210. Because the sub-images 34, 35 and 36 are respectively projected to different portions of the prism 211, a progress direction of the image is varied, and an array 37 of image points corresponding to the sub-images 34, 35 and 36 are formed by the microlenses 310 of the microlens array unit 300. The respective image points of the array 37 of the image points are diffused to generate a consecutive image on the diffusion plate 400 without overlapping with the images formed by diffusion of the adjacent image points. The beam penetrating the diffusion plate 400 forms a viewing zone 38 within two dotted lines which intersect each other. The lines depicted in FIG. 6 represent boundary lines of the pixels composing the sub-images.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A three-dimensional imaging system based on a stereo hologram comprising:
    an image projection unit including a plurality of image projection modules two-dimensionally arranged equidistantly from each other and projecting images, each of the image projection modules including
        an image projector configured to project one of the images composed of an array of sub-images, and
        a focus lens part configured to convert the image projected from the image projector;
    a transmission diffusion unit diffusing and transmitting the images from the image projection modules and arranged parallel with and next to the image projection unit, the transmission diffusion unit including
        a prism array plate including a plurality of prisms separated from each other and arranged consecutively such that a bottom surface of each of the prisms is directed toward the image projection unit;
    a microlens array unit arranged parallel with and next to the transmission diffusion unit and including a plurality of groups of microlenses arranged consecutively, wherein each group of microlenses includes nine microlenses and corresponds to a respective one of the prisms; and a diffusion plate arranged parallel with and next to the microlens array unit and diffusing the images transmitted through the microlens array unit, wherein:

the image projection unit, the transmission diffusion unit, the microlens array unit and the diffusion plate are arranged in the order of a traveling direction of the images projected from the image projection unit, the focus lens part of a first image projection module converges a first image projected from the image projector of the first image projection module to a first image point, a first prism of the prisms which is disposed across the first image point from the first image projection module, transmits and diffuses only the first image projected from the first image projection module and passed through the first image point, a first group of the groups of microlenses transmits the first image which is projected from the first image projection module and passed through the first prism, and generates nine second image points, and the diffusion plate diffuses the nine second image points to generate consecutive images, wherein each of the consecutive images does not overlap with adjacent consecutive images.

2. The three-dimensional imaging system based on a stereo hologram according to claim 1, wherein the transmission diffusion unit is located at a position at which the image projected from any one of the image projection modules of the image projection unit intersects with the image projected from the adjacent image projection module.

3. The three-dimensional imaging system based on a stereo hologram according to claim 1, wherein the bottom surface of each of the prims is formed to have the same shape and area as the image projected from each of the image projection modules.

4. The three-dimensional imaging system based on a stereo hologram according to claim 1, wherein the prism array plate is formed such that a center of the image projected from each of the image projection modules is consistent with an apex of the prism corresponding to the image.

5. The three-dimensional imaging system based on a stereo hologram according to claim 1, wherein the bottom surface of each of the prisms of the prism array plate is located at a focus of the microlens array unit.

6. The three-dimensional imaging system based on a stereo hologram according to claim 1, wherein the bottom surface of each of the prisms of the prism array plate is located at a distance greater than two times a focal distance of the microlens array unit.

7. The three-dimensional imaging system based on a stereo hologram according to claim 1, wherein the array of sub-images of the images projected to the transmission diffusion unit is consistent with the array of the microlenses of the microlens array unit.

8. The three-dimensional imaging system based on a stereo hologram according to claim 1, wherein each of the images projected to the transmission diffusion unit has the same or greater vertical and horizontal sizes than each of the microlenses of the microlens array unit.

9. The three-dimensional imaging system based on a stereo hologram according to claim 1, wherein the diffusion plate functions as an image display screen.

10. The three-dimensional imaging system based on a stereo hologram according to claim 1, wherein the diffusion plate is located at a position at which the images converted into the second image points by the microlens array unit are diffused and intersect each other.

* * * * *